US012632942B2

(12) United States Patent
Chi et al.

(10) Patent No.: US 12,632,942 B2
(45) Date of Patent: May 19, 2026

(54) REAL-TIME HIGH-RESOLUTION BINOCULAR CAMERA DISTORTION CORRECTION IMPLEMENTATION METHOD BASED ON FPGA

(71) Applicant: Zhuhai Dipu Medical Technology Co., Ltd., Zhuhai (CN)

(72) Inventors: Chongwei Chi, Zhuhai (CN); Kunshan He, Zhuhai (CN)

(73) Assignee: Zhuhai Dipu Medical Technology Co., Ltd., Zhuhai (CN)

( * ) Notice: Subject to any disclaimer, the term of this patent is extended or adjusted under 35 U.S.C. 154(b) by 260 days.

(21) Appl. No.: 18/639,912

(22) Filed: Apr. 18, 2024

(65) Prior Publication Data

US 2025/0191149 A1 Jun. 12, 2025

(30) Foreign Application Priority Data

Dec. 7, 2023 (CN) ......................... 202311678408.X

(51) Int. Cl.
*G06T 5/80* (2024.01)
*G06T 5/00* (2024.01)

(52) U.S. Cl.
CPC ...... *G06T 5/80* (2024.01); *G06T 2207/10012* (2013.01)

(58) Field of Classification Search
USPC ........................................................ 382/275
See application file for complete search history.

(56) References Cited

U.S. PATENT DOCUMENTS

| 10,630,921 B2 * | 4/2020 | Douady-Pleven ..... H04N 25/61 |
| 12,026,859 B2 * | 7/2024 | Wagenaar ........... H04N 19/136 |

(Continued)

FOREIGN PATENT DOCUMENTS

| CN | 104270570 | * 1/2015 | .............. G06T 5/80 |
| CN | 117078548 A | 11/2023 | |
| CN | 117078548 | * 10/2024 | .............. G06T 5/80 |

OTHER PUBLICATIONS

Blasinski et al., FPGA Architecture for Real-Time Barrel Distortion Correction of Colour Images, IEEE 978-1-61284-350-6/11, pp. 1-6. (Year: 2011).*

*Primary Examiner* — Ishrat I Sherali
(74) *Attorney, Agent, or Firm* — Rondaus PLLC; George Liu

(57) ABSTRACT

Provided in the present disclosure is a real-time high-resolution binocular camera distortion correction implementation method based on FPGA. The method includes acquiring input video information in a YUV format, and performing YUV channel separation on the input video information; compressing U and V video signals inputted; performing distortion correction on a Y video signal, and performing distortion correction on the compressed U and V video signals, including calculating binocular camera distortion parameters, calculating a coordinate mapping relationship of Y, U, and V channels, and calculating and generating target image data by using an interpolation algorithm; amplifying U and V target image data after distortion correction to fit an input image; and outputting separated Y, U, and V channel target image data according to a raw image format. According to the present disclosure, high resolution and high frame rate videos can be processed in real time.

10 Claims, 4 Drawing Sheets

(56)          References Cited

U.S. PATENT DOCUMENTS

| | | | |
|---|---|---|---|
| 2012/0050074 A1* | 3/2012 | Bechtel | G06V 10/147 |
| | | | 382/104 |
| 2012/0147205 A1* | 6/2012 | Lelescu | H04N 23/62 |
| | | | 348/E5.024 |
| 2021/0029335 A1* | 1/2021 | Butters | H04N 7/0117 |
| 2024/0112315 A1* | 4/2024 | Powell | G06T 5/80 |
| 2025/0016281 A1* | 1/2025 | Wang | H04N 1/387 |
| 2025/0191149 A1* | 6/2025 | Chi | G06T 5/80 |

* cited by examiner

REAL-TIME HIGH-RESOLUTION BINOCULAR CAMERA DISTORTION CORRECTION IMPLEMENTATION METHOD BASED ON FPGA

TECHNICAL FIELD

The present disclosure herein relates to the technical field of video image processing, and specifically to a real-time high-resolution binocular camera distortion correction implementation method based on FPGA thereof.

BACKGROUND

Endoscopes are one of the most important surgical devices in minimally invasive surgery. The technology has the advantages of being small in injury and fast in recovery without opening the stomach, and has become an inevitable trend in the development of modern surgery. Traditional 2D endoscopes can only show plane images and cannot present a three-dimensional effect of an object. Compared to the traditional 2D endoscopes, 3D endoscopes strengthen the spatial perception in the field of view of an operator by providing three-dimensional images, with a clearer surgical field of view and more obvious anatomical levels, whereby the drawbacks of the 2D endoscopes are overcome to a certain extent.

3D endoscopic imaging is based on binocular cameras. Due to reasons such as manufacturing process and mounting errors, ideal lenses do not exist in reality, and maintaining lens and image sensor planes strictly parallel is very difficult. Therefore, a real imaging effect of a camera tends to have some degree of distortion, and the distortion of the binocular camera affects a 3D imaging effect, whereby, before related images are processed, pre-processing of distortion correction needs to be completed.

At present, the distortion correction of the binocular camera faces a plurality of difficulties:

(1) for a traditional distortion correction method, if an image is stored in a BRAM memory of an FPGA, more resources are consumed, and due to limited FPGA BRAM resources, only the cameras with small distortion amplitudes or low image resolutions can be corrected.

(2) For traditional camera distortion, if the image is stored in a DDR, more DDR memory resources are occupied, whereby the overall performance of a system is reduced; and the DDR is difficult to process the distortion of high resolution images in real time, and needs to occupy a large number of DDR bandwidths, whereby the method is not suitable for use in system analysis.

SUMMARY

In order to solve the problems of existing distortion processing methods, the present disclosure is intended to provide a real-time high-resolution binocular camera distortion correction implementation method based on FPGA. By means of the method, high resolution and high frame rate videos can be processed in real time, FPGA resource occupancy is optimized, distortion of large-sized videos can be realized, relatively-large video distortion can be processed, and a 3D imaging effect can be improved.

The present disclosure realizes the above objective through the following technical solutions:

a real-time high-resolution binocular camera distortion correction implementation method based on FPGA, comprising the following steps:

acquiring input video information in a YUV format, and performing YUV channel separation on the input video information to respectively obtain Y, U, and V video signals;

compressing the U and V video signals inputted, and not compressing the Y video signal inputted;

performing distortion correction on the Y video signal, and performing distortion correction on the compressed U and V video signals, comprising calculating binocular camera distortion parameters, calculating a coordinate mapping relationship of Y, U, and V channels, and calculating and generating target image data by using an interpolation algorithm;

amplifying U and V target image data that has been subjected to distortion correction to fit an input image; and outputting separated Y, U, and V channel target image data according to a raw image format.

According to the real-time high-resolution binocular camera distortion correction implementation method based on FPGA provided in the present disclosure, an FPGA end is used to perform distortion correction; the FPGA end is a xilinx ultrascale FPGA chip; and the chip is provided with ultra_ram to replace BRAM for data caching.

According to the real-time high-resolution binocular camera distortion correction implementation method based on FPGA provided in the present disclosure, when the input video information in the YUV format is acquired, the input video information in RGB or other formats is converted into the YUV format for display.

According to the real-time high-resolution binocular camera distortion correction implementation method based on FPGA provided in the present disclosure, when the coordinate mapping relationship of the Y, U, and V channels is calculated, pixel points on an image plane are re-arranged according to a distortion model; and gray values of the pixel points after spatial transformation are re-assigned.

According to the real-time high-resolution binocular camera distortion correction implementation method based on FPGA provided in the present disclosure, mapping coordinates are calculated by using an internal parameter matrix H of a camera, and distortion coefficients $k_i(i=1, 2, 3)$ and $p_i(i=1, 2)$; and assuming that $(x_p, y_p)$ is a pixel point on a target image, and $(x_s, y_s)$ is a pixel mapping coordinate corresponding to the pixel point $(x_p, y_p)$, a calculation formula of the pixel mapping coordinate $(x_s, y_s)$ is expressed as (1) and (2):

$$\begin{bmatrix} x_d \\ y_d \\ 1 \end{bmatrix} = H^{-1} \times \begin{bmatrix} x_p \\ y_d \\ 1 \end{bmatrix} = \begin{bmatrix} \dfrac{1}{dx} & 0 & u_0 \\ 0 & \dfrac{1}{dy} & v_o \\ 0 & 0 & 1 \end{bmatrix} \times \begin{bmatrix} x_p \\ y_p \\ 1 \end{bmatrix} \tag{1}$$

$$\begin{bmatrix} x_s \\ y_s \end{bmatrix} = \begin{bmatrix} \dfrac{1}{dx} & 0 \\ 0 & \dfrac{1}{dx} \end{bmatrix} \times$$

$$\begin{bmatrix} x_d \times (1 + k_1 r^2 + k_2 r^4 + k_3 r^6) + [2 \times p_1 \times y_d + p_2 \times (r^2 + 2x_d^2)] \\ y_d \times (1 + k_1 r^2 + k_2 r^4 + k_3 r^6) + [2 \times p_2 \times x_d + p_1 \times (r^2 + 2y_d^2)] \end{bmatrix} + \begin{bmatrix} u_0 \\ v_0 \end{bmatrix}. \tag{2}$$

According to the real-time high-resolution binocular camera distortion correction implementation method based on FPGA provided in the present disclosure, when the target image data is calculated and generated by using the interpolation algorithm, gray values of pixel points after spatial transformation are re-assigned by using bilinear interpolation, and after linear interpolation is performed once respectively in x and y directions, a gray value of a target pixel is obtained.

According to the real-time high-resolution binocular camera distortion correction implementation method based on FPGA provided in the present disclosure, assuming that the value of a function f at a point P=(x, y) is unknown, and assuming that the values of the function f at four points of Q11=(x1, y1), Q12=(x1, y2), Q21=(x2, y1), and Q22=(x2, y2) are known, linear interpolation is performed in the x direction to obtain formulas (3) and (4):

$$f(R_1) \approx \frac{x_2 - x}{x_2 - x_1} f(Q_{11}) + \frac{x - x_1}{x_2 - x_1} f(Q_{21}), R_1 = (x, y_1) \quad (3)$$

$$f(R_2) \approx \frac{x_2 - x}{x_2 - x_1} f(Q_{12}) + \frac{x - x_1}{x_2 - x_1} f(Q_{22}), R_2 = (x, y_2) \quad (4)$$

then linear interpolation is performed in the y direction to obtain a formula (5):

$$f(P) \approx \frac{y_2 - y}{y_2 - y_1} f(R_1) + \frac{y - y_1}{y_2 - y_1} f(R_2) \quad (5)$$

therefore, a final result of bilinear interpolation is expressed as a formula (6):

$$f(P) \approx \frac{(x_2 - x) \times (y_2 - y)}{(x_2 - x_1) \times (y_2 - y_1)} f(Q_{11}) + \frac{(x - x_1) \times (y_2 - y)}{(x_2 - x_1) \times (y_2 - y_1)} f(Q_{21}) + \quad (6)$$
$$\frac{(x_2 - x) \times (y - y_1)}{(x_2 - x_1) \times (y_2 - y_1)} f(Q_{12}) + \frac{(x - x_1) \times (y - y_1)}{(x_2 - x_1) \times (y_2 - y_1)} f(Q_{22}).$$

According to the real-time high-resolution binocular camera distortion correction implementation method based on FPGA provided in the present disclosure, when distortion correction is performed on the video signals of the Y, U, and V channels, respectively, the video signals are transmitted to an FPGA end according to the format of a pixel flow, received video data is cached into ULTRA_RAM, and since the ULTRA_RAM of a selected signal is 72 bits, 8-bit YUV422 data is first subjected to data extension and aligned to 72 bits, and then pixel data is stored into the ULTRA_RAM;

according to the binocular camera distortion parameters provided by a host computer, by means of assembly line arrangement, a pixel mapping coordinate in a raw image corresponding to one pixel is guaranteed to be calculated within each clock cycle, and the pixel mapping coordinate is stored according to the format of Q12.20.

According to the real-time high-resolution binocular camera distortion correction implementation method based on FPGA provided in the present disclosure, according to a correspondence relationship between integer parts of the pixel mapping coordinate, pixel data of four adjacent pixels are read from ULTRA_RAM for row caching, and when a coordinate after a mapping coordinate is calculated as (m, n), pixel values of four points of (m, n), (m+1, n), (m, n+1), and (m+1, n+1) are read;

a final pixel value is calculated according to a bilinear interpolation calculation formula and a coordinate mapping fractional part;

video streaming data of a single channel that has been subjected to distortion correction is outputted.

According to the real-time high-resolution binocular camera distortion correction implementation method based on FPGA provided in the present disclosure, the Y target image data that has been subjected to distortion correction is sent to data reorganization FIFO;

the U target image data that has been subjected to distortion correction is amplified, and then sent to the data reorganization FIFO;

the V target image data that has been subjected to distortion correction is amplified, further compressed, and then sent to the data reorganization FIFO.

Therefore, compared with the related art, the present disclosure has the following beneficial effects:

1. the present disclosure is applied to a high definition endoscope, a laparoscopic imaging system, etc., and can process distortion correction of ultra-high definition videos with 4K 60 hz in real time.

2. The present disclosure provides a yuv component compression optimization mode during a distortion process, which can process a video source with a large distortion amplitude in real time.

3. The present disclosure provides an FPGA row caching storage resource optimization mode, whereby FPGA resource occupancy is optimized, and resource situations such as a BRAM and ULTRA RAM may be flexibly allocated according to actual use situations, thereby saving storage and logic resources for FPGA implementation.

The present disclosure further provides an electronic device, including:

a memory storing a computer-executable instruction;

a processor storing a computer-executable instruction, wherein the processor is configured to operate the computer-executable instruction.

The computer-executable instruction, when being operated by the processor, implements steps of the real-time high-resolution binocular camera distortion correction implementation method based on FPGA described in any one of the above.

The present disclosure further provides a storage medium. The storage medium stores a computer program. The computer program, when being executed by a processor, is used for implementing steps of the real-time high-resolution binocular camera distortion correction implementation method based on FPGA described in any one of the above.

Therefore, the present disclosure further provides the electronic device and storage medium of the real-time high-resolution binocular camera distortion correction implementation method based on FPGA, including one or more memories and one or more processors. The memory is configured to store program codes, intermediate data generated during program running, storage of model output results, and storage of models and model parameters; the processor is configured to process processor resources occupied during code running, and a plurality of processor resources occupied during model training.

The present disclosure is further described in detail below with reference to the drawings and specific implementations.

DETAILED DESCRIPTION OF THE EMBODIMENTS

In order to make objectives, technical solutions, and advantages of the present disclosure clearer, the technical solutions in the present disclosure will be clearly and completely described below in combination with the drawings in the present disclosure. It is apparent that the described embodiments are part of the embodiments of the present disclosure, not all the embodiments. Based on the embodiments in the present disclosure, all other embodiments obtained by those of ordinary skill in the art without creative work shall fall within the protection scope of the present disclosure.

References to "embodiments" here mean that particular features, structures or characteristics described in combination with the embodiments may be included in at least one embodiment of the present disclosure. The presence of the phrase in various positions in the specification does not necessarily mean the same embodiment, nor is it a separate or alternative embodiment that is mutually exclusive with other embodiments. It is understood, both explicitly and implicitly, by those skilled in the art that the embodiments described here may be combined with other embodiments.

Figure 1:
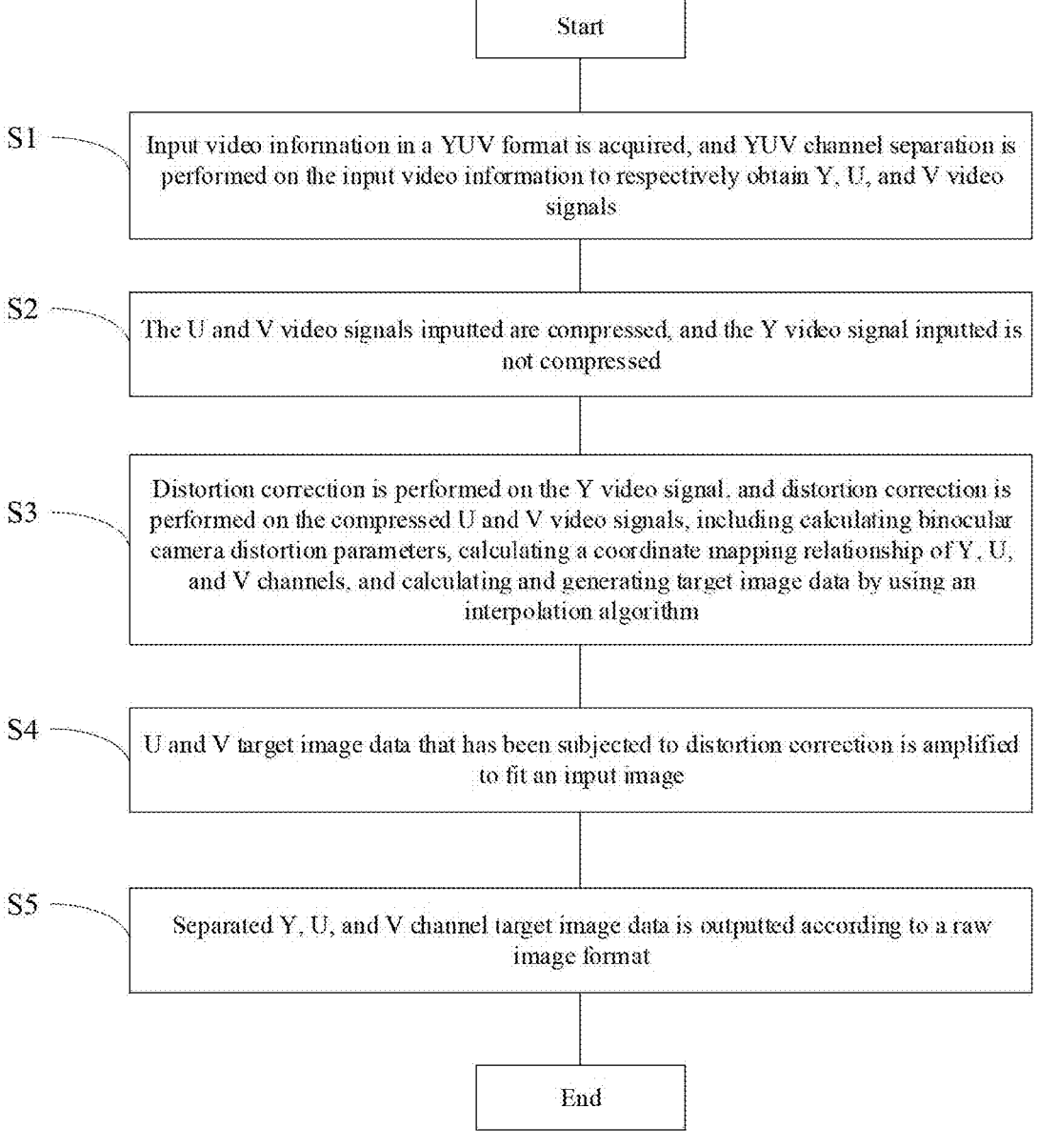
FIG. 1 is a flowchart of a real-time high-resolution binocular camera distortion correction implementation method embodiment based on FPGA according to the present disclosure.

Referring to FIG. 1, the present disclosure provides a real-time high-resolution binocular camera distortion correction implementation method based on FPGA, comprising the following steps:

at S1, acquiring input video information in a YUV format, and performing YUV channel separation on the input video information to respectively obtain Y, U, and V video signals;

at S2, compressing the U and V video signals inputted, and not compressing the Y video signal inputted;

at S3, performing distortion correction on the Y video signal, and performing distortion correction on the compressed U and V video signals, comprising calculating binocular camera distortion parameters, calculating a coordinate mapping relationship of Y, U, and V channels, and calculating and generating target image data by using an interpolation algorithm;

at S4, amplifying U and V target image data that has been subjected to distortion correction to fit an input image; and at S5, outputting separated Y, U, and V channel target image data according to a raw image format.

In this embodiment, an FPGA end is used to perform distortion correction; the FPGA end is a xilinx ultrascale FPGA chip; and the chip is provided with ultra_ram to replace BRAM for data caching.

In this embodiment, when the input video information in the YUV format is acquired, the input video information in RGB or other formats is converted into the YUV format for display.

Figure 2:
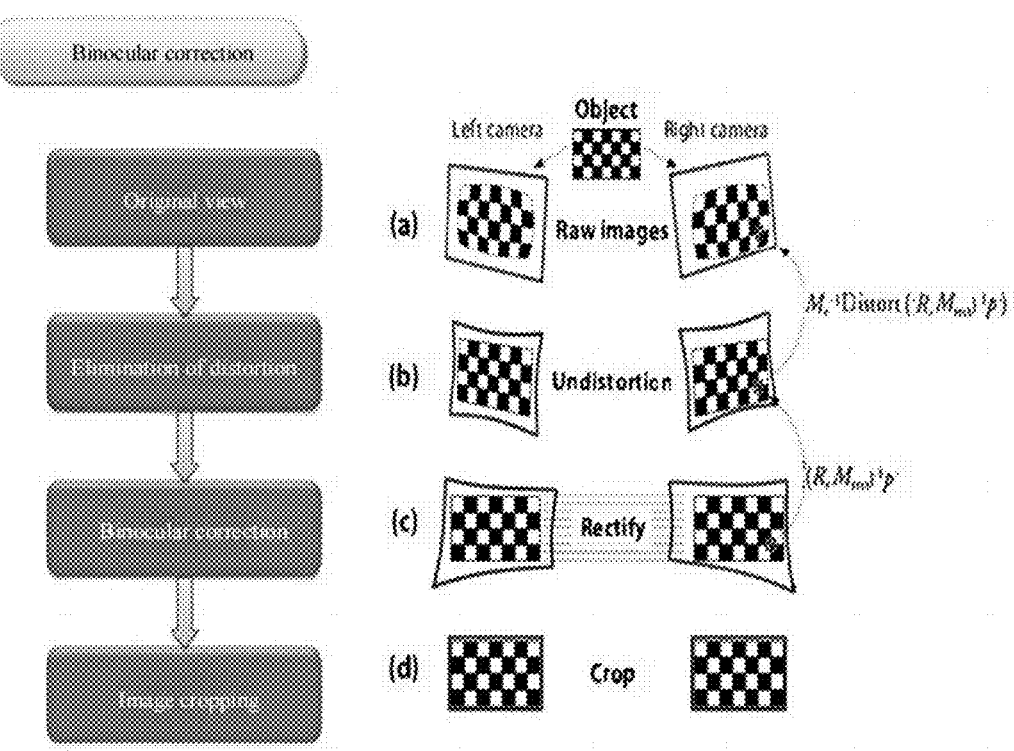
FIG. 2 is a schematic diagram of binocular camera distortion correction of a real-time high-resolution binocular camera distortion correction implementation method embodiment based on FPGA according to the present disclosure.

Specifically, as shown in FIG. 2, distortion correction of the FPGA end mainly processes three portions of (b), (c), and (d) in FIG. 2, and the specific implementation process may include three steps: calculating binocular camera distortion parameters, calculating a coordinate mapping relationship between a raw image and a target image, and calculating and generating the target image by using an interpolation algorithm. The process of calculating the binocular camera distortion parameters is completed by a host computer. The FPGA mainly implement the subsequent two portions: calculating the coordinate mapping relationship between the raw image and the target image, and calculating and generating the target image by using the interpolation algorithm. The specific calculation formula and method are as follows:

a distortion correction algorithm based on image mapping consists of the following two basic operations: re-arranging pixel points on an image plane are re-arranged according to a distortion model; and re-assigning gray values of the pixel points after spatial transformation.

The acquisition of mapping coordinates may be calculated by using an internal parameter matrix H of a camera, and distortion coefficients $ki(i=1, 2, 3)$ and $pi(i=1, 2)$; and assuming that $(xp, yp)$ is a pixel point on a target image, and $(xs, ys)$ is a pixel mapping coordinate corresponding to the pixel point $(xp, yp)$, a calculation formula of the pixel mapping coordinate $(xs, ys)$ is expressed as (1) and (2):

$$\begin{bmatrix} x_d \\ y_d \\ 1 \end{bmatrix} = H^{-1} \times \begin{bmatrix} x_p \\ y_d \\ 1 \end{bmatrix} = \begin{bmatrix} \dfrac{1}{dx} & 0 & u_0 \\ 0 & \dfrac{1}{dy} & v_o \\ 0 & 0 & 1 \end{bmatrix} \times \begin{bmatrix} x_p \\ y_p \\ 1 \end{bmatrix} \tag{1}$$

$$\begin{bmatrix} x_s \\ y_s \end{bmatrix} = \begin{bmatrix} \dfrac{1}{dx} & 0 \\ 0 & \dfrac{1}{dx} \end{bmatrix} \times \tag{2}$$

$$\begin{bmatrix} x_d \times (1 + k_1 r^2 + k_2 r^4 + k_3 r^6) + [2 \times p_1 \times y_d + p_2 \times (r^2 + 2x_d^2)] \\ y_d \times (1 + k_1 r^2 + k_2 r^4 + k_3 r^6) + [2 \times p_2 \times x_d + p_1 \times (r^2 + 2y_d^2)] \end{bmatrix} + \begin{bmatrix} u_0 \\ v_0 \end{bmatrix}.$$

Since coordinates obtained through inverse mapping are generally non-integer, i.e., a calculated pixel coordinate does not fall on a pixel point of a raw image but near the pixel point, interpolation needs to be performed. Considering interpolation effects and hardware implementation costs of different interpolation algorithms, in this embodiment, when the target image data is calculated and generated by using the interpolation algorithm, the gray values of the pixel points after spatial transformation are re-assigned by using bilinear interpolation. Details may be based on imaging quality and resource requirements, or may select a nearest interpolation algorithm or a regional interpolation algorithm, and are not described herein again.

The bilinear interpolation calculation process is to obtain the gray value of the target pixel after linear interpolation is performed once respectively in x and y directions.

Assuming that the value of a function f to be obtained at a point $P=(x, y)$ is unknown, and assuming that the values of the function f at four points of $Q11=(x1, y1)$, $Q12=(x1, y2)$, $Q21=(x2, y1)$, and $Q22=(x2, y2)$ are known, in the most common situation, f is a pixel value of one pixel point. Then linear interpolation is performed in the x direction to obtain formula (3) and (4):

$$f(R_1) \approx \frac{x_2 - x}{x_2 - x_1} f(Q_{11}) + \frac{x - x_1}{x_2 - x_1} f(Q_{21}), R_1 = (x, y_1) \tag{3}$$

$$f(R_2) \approx \frac{x_2 - x}{x_2 - x_1} f(Q_{12}) + \frac{x - x_1}{x_2 - x_1} f(Q_{22}), R_2 = (x, y_2) \tag{4}$$

then linear interpolation is performed in the y direction to obtain a formula (5):

$$f(P) \approx \frac{y_2 - y}{y_2 - y_1} f(R_1) + \frac{y - y_1}{y_2 - y_1} f(R_2) \tag{5}$$

therefore, a final result of bilinear interpolation is expressed as a formula (6):

$$f(P) \approx \frac{(x_2 - x) \times (y_2 - y)}{(x_2 - x_1) \times (y_2 - y_1)} f(Q_{11}) + \frac{(x - x_1) \times (y_2 - y)}{(x_2 - x_1) \times (y_2 - y_1)} f(Q_{21}) + \tag{6}$$

$$\frac{(x_2 - x) \times (y - y_1)}{(x_2 - x_1) \times (y_2 - y_1)} f(Q_{12}) + \frac{(x - x_1) \times (y - y_1)}{(x_2 - x_1) \times (y_2 - y_1)} f(Q_{22}).$$

Figure 3:
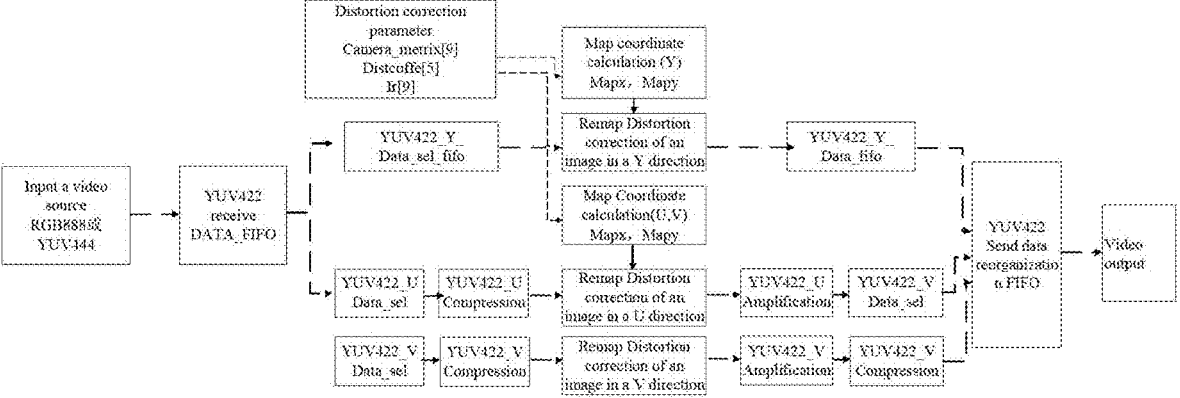
FIG. 3 is a schematic diagram of an FPGA end implementation process of a real-time high-resolution binocular camera distortion correction implementation method embodiment based on FPGA according to the present disclosure.

In a practical application, a xilinx ultrascale mpsoc7EV chip is used to perform distortion correction, and since the chip is provided with ultra_ram to replace a BRAM for data caching, as shown in FIG. 3, a specific FPGA implementation process is as follows:

format conversion: other formats inputted such as RGB are converted into the YUV format for display. For example, format conversion is performed on a video inputted, and YUV channel separation is performed on the video. Since human eyes are more sensitive to a bright video than chroma, the compression method of this embodiment recommends converting the video in other formats such as RGB to the YUV format for distortion correction;

compression: the UV video signals inputted are compressed to reduce a data volume, different compression algorithms may be used according to specific resources and imaging effects, and below, resource evaluation is performed by using the bilinear interpolation algorithm;

distortion correction: includes two portions of calculation of the mapping coordinates of the three channels, and calculation of interpolation remap;

amplification: the UV data that has been subjected to distortion correction is amplified to fit the input image;

output: the separated YUV channel data is outputted according to the raw image format.

Wherein a specific calculation result of the Y/U/V single channel is specifically shown as follows:

the video signals inputted are transmitted to the FPGA end according to the format of a pixel flow. Due to the reason of image distortion, a pixel point coordinate [i, j] of a target image may correspond to a raw image coordinate [m, n]. Generally, when [m, n] exceeds a row or a column of a raw image, 0 is assigned to the value of the point pixel, represented as a black color. Since the value of m, n depends on camera parameters and specific product mounting processes, it is expected, during actual use, that the FPGA can process a distorted image as large as possible. However, too large distortion amplitude causes a large difference between [i, j] and [m, n], during the processing of the FPGA, if the difference (mainly the difference between i and m), more rows need to be cached, and more cached resources such as the BRAM are occupied. The method provided in this embodiment is to try to optimize the FPGA resource occupancy with less impact and to achieve a better distortion effect.

Figure 4:
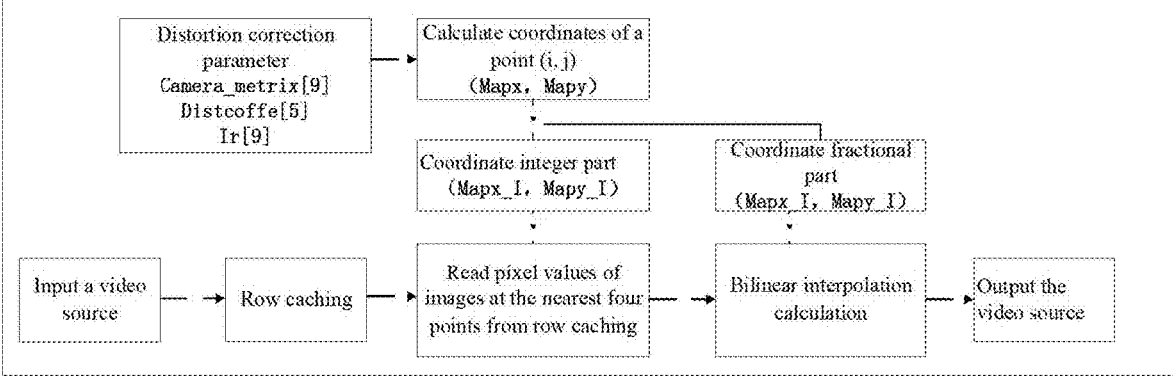
FIG. 4 is a schematic diagram of a specific calculation and implementation process of single channel data in an FPGA end of a real-time high-resolution binocular camera distortion correction implementation method embodiment based on FPGA according to the present disclosure.

A specific calculation and implementation process of single channel data (e.g., Y channel in YUV422 or R/G/B in RGB888) in the FPGA is shown in FIG. 4. Details are described by using Y in the YUV422 format as an example, the calculation and mapping processes of other channels are the same.

When distortion correction is performed on the video signals of the Y, U, and V channels, respectively, the video signals are transmitted to an FPGA end according to the format of a pixel flow, a first pixel at a first row is first received. Received video data is cached into ULTRA_RAM, and since the ULTRA_RAM of a selected signal is 72 bits, 8-bit YUV422 data is first subjected to data extension and aligned to 72 bits, and then pixel data is stored into the ULTRA_RAM.

According to the binocular camera distortion parameters provided by the host computer, by means of assembly line arrangement, it is ensured that a pixel coordinate calculation unit can calculate a pixel mapping coordinate in a raw image corresponding to one pixel is calculated within each clock cycle, and the pixel mapping coordinate is stored according to the format of Q12.20 (the high 12 bits in Q12.20 are integer parts, and the low 20 bits are fractional parts).

According to a correspondence relationship between integer parts of the pixel mapping coordinate, pixel data of four adjacent pixels are read from ULTRA_RAM for row caching, and when a coordinate after a mapping coordinate is calculated as (m, n), pixel values of four points of (m, n), (m+1, n), (m, n+1), and (m+1, n+1) are read.

A final pixel value is calculated according to a bilinear interpolation calculation formula and a coordinate mapping fractional part;

video streaming data of a single channel that has been subjected to distortion correction is outputted.

Wherein the Y target image data that has been subjected to distortion correction is sent to data reorganization FIFO;

wherein the U target image data that has been subjected to distortion correction is amplified, and then sent to the data reorganization FIFO;

wherein the V target image data that has been subjected to distortion correction is amplified, further compressed, and then sent to the data reorganization FIFO.

Since a BRAM and a LUT in the FPGA are main storage and calculation units, and are heavily used by other logic processing operations, the mode of using ULTRA_RAM for storage is a more rational mode, as shown in Table (1), Table (1) shows comparison of resource consumption using the ULTRA_RAM mode compared to the BRAM mode:

| Size and resource type of video source | Original algorithm resource consumption (piece) [see Note 1] | | Resource consumption after optimization with URAM (piece) | |
|---|---|---|---|---|
| | Resource | Resource proportion [see Note 2] | | Resource proportion |
| 3840 × 2160 (GRAY) | | | | |
| BRAM_18Kbit | 512 | 82% | 22 | 3 |
| DSP48E | 72 | 4% | 60 | 3 |
| FF | 26857 | 5% | 26333 | 5 |
| LUT | 21885 | 9% | 22099 | 9 |
| URAM_288Kbit | 0 | 0% | 60 | 62 |
| 1920 × 1080 (GRAY) | | | | |
| BRAM_18Kbit | 272 | 82% | 20 | 3 |
| DSP48E | 72 | 4% | 60 | 3 |
| FF | 26767 | 5% | 26251 | 5 |
| LUT | 21807 | 9% | 22001 | 9 |
| URAM_288Kbit | 0 | 0% | 30 | 31 |

Note 1:
resource consumption is evaluated as a two-way grayscale video, and the number of cached rows is 128; and there is a certian difference in specific resource consumption depending on the implementation mode and code style.

Note 2:
a resource consumption ratio is obtained based on a selected xilinx device, with model number being XCZU7EV.

From Table (1), it may be seen that, after the ultra_ram is used, the requirement for the BRAM is greatly reduced.

As shown in Table 2. Table (2) shows resource consumption of using the YUV format to perform distortion correction, and first compressing and then amplifying U/V.

Note 4: a resource consumption ratio is obtained based on a selected xilinx device, with model number being XCZU7EV.

Note 5: in the compression and amplification resource consumption, 4 k and 2 k both are compressed to

| Size and resource type of video source | Original algorithm resource consumption (piece) [see Note 3] | | Resource consumption after optimization with URAM (piece) | | Resource consumption and UV compression consumption after optimization with URAM (piece) [see Note 5] | |
|---|---|---|---|---|---|---|
| | Resource | proportion (%) [see Note 4] | | Resource proportion (%) | | Resource proportion (%) |
| 3840 × 2160 (YUV444 or RGB888) | | | | | | |
| BRAM_18Kbit | 704 | 112% | 34 | 5% | 70 | 11% |
| DSP48E | 88 | 5% | 76 | 4% | 152 | 9% |
| FF | 28093 | 6% | 26507 | 5% | 41509 | 9% |
| LUT | 22403 | 9% | 23025 | 9% | 44389 | 19% |
| URAM_288Kbit | 0 | 0% | 90 | 93% | 46 | 48% |
| 1920 × 1080 (YUV444 or RGB888) | | | | | | |
| BRAM_18Kbit | 360 | 57% | 28 | 4% | 56 | 9% |
| DSP48E | 88 | 5% | 76 | 4% | 152 | 9% |
| FF | 27187 | 5% | 27537 | 5% | 41945 | 9% |
| LUT | 22363 | 9% | 23017 | 9% | 43981 | 19% |
| URAM_288Kbit | 0 | 0% | 90 | 93% | 24 | 25% |

Note 3: resource consumption is evaluated as a two-way color YUV444 video, and the number of cached rows is 64; and there is a certain difference in specific resource consumption depending on the implementation mode and code style.

960×540, 4 k is compressed by ¼, 2 k is compressed by ½, wherein the occupation of the LUT and the FF is increased due to compression and amplification algorithms.

From Table (2), it may be seen that, after the ultra_ram is used, the requirement for the BRAM is greatly reduced, whereby distortion requirements for 4 k and 2 k two-way videos may be met, and resource consumption may be further optimized during actual use according to a specific distortion amplitude and an imaging quality requirement. In addition, the use of the BRAM and the ultra_ram for Y/U/V component during distortion may be flexibly adjusted according to the actual resource consumption of the BRAM and the ultra_ram.

Next, comparison of distortion correction results using compression and not using compression: there is no difference in the Y direction, Y usually does not use the compression algorithm, the results are different from not compression according to a compression ratio in the U/V direction, and after ½ compression and decompression, pixel difference and distribution are compared through software, it is concluded that, at the largest distortion part, the mode of first compressing, then distorting, and amplifying the u/v has about 1-3 pixels of position difference from direct distortion. There is some correlation between the specific situations and the camera distortion parameters, and this conclusion may be used as a reference. In terms of delay, when the FPGA operates at 300 MHz without using compression and decompression algorithms, it takes 7.25 ms to process 1 frame of the entire 2 k image; after compression and decompression are used, overall processing time takes 7.44 ms; and since an assembly line working mode is used, the decompression and compression process does not add much delay, whereby the real-time performance of the image is barely affected during actual use.

To sum up, when individual distortion of the YUV format is performed on an image, the use of storage resources in the FPGA may be effectively and flexibly controlled, and real-time distortion correction of an image up to 4K can be realized. During actual measurement, 2 k and 4 k images may both achieve a processing speed of up to 60 hz, and distortion with a large amplitude can be processed. When YUV444 2 k cached 128 rows or 4 k cached 64 rows are processed, the resource proportion of ULTRA RAM in the FPGA is approximately 50%.

Therefore, the method provided in this embodiment may be applied to a high definition endoscope, a laparoscopic imaging system, etc., and can process distortion correction of ultra-high definition videos with 4K 60 hz in real time. This embodiment provides a yuv component compression optimization mode during a distortion process, which can process a video source with a large distortion amplitude in real time. This embodiment provides an FPGA row caching storage resource optimization mode, whereby FPGA resource occupancy is optimized, and resource situations such as a BRAM and ULTRA RAM may be flexibly allocated according to actual use situations, thereby saving storage and logic resources for FPGA implementation.

An embodiment provides an electronic device. The electronic device may be a server. The computer device includes a processor, a memory, and a network interface, which are connected by means of a system bus. The processor of the electronic device is configured to provide computing and control capabilities. The memory of the electronic device includes a non-volatile storage medium or an internal memory. The non-volatile storage medium stores an operating system, a computer program, and a database. The internal memory provides an environment for the running of the operating system and the computer program in the non-volatile storage medium. The database of the electronic device is configured to store data. The network interface of the electronic device is configured to be communicatively connected to an external terminal by means of a network. The computer program, when being executed by the processor, implements the real-time high-resolution binocular camera distortion correction implementation method based on FPGA.

It may be understood by those skilled in the art that the structure of the electronic device shown in this embodiment, which is only a portion of the structure associated with the solutions of the present disclosure, does not constitute a limitation of the electronic device to which the solutions of the present disclosure are applied. The specific electronic device may include more or fewer components than shown in this embodiment, or be combined with certain components, or have a different arrangement of components.

An embodiment provides a computer-readable storage medium, which stores a computer program, the computer program, when executed by a processor, implementing the operations in the foregoing method embodiments.

Those of ordinary skill in the art will appreciate that implementing all or part of the processes in the methods described above may be accomplished by instructing associated hardware by a computer program, which may be stored in a non-volatile computer-readable storage medium, which, when executed, may include processes as embodiments of the methods described above. Any reference to the memory, storage, the database, or other media used in the embodiments provided in this application may include at least one of a non-volatile memory or a volatile memory. The non-volatile memory may include a read-only memory (ROM), a magnetic tape, a floppy disk, a flash memory, an optical memory, or the like. The volatile memories may include a Random Access Memory (RAM), or an external cache memory. By way of description and not limitation, the RAM may be in various forms, such as a static random access memory (SRAM), a dynamic random access memory (DRAM), or the like.

In addition, a logical instruction in the memory may be implemented in the form of the software functional unit and sold or used as an independent product, and can be stored in a computer-readable storage medium. Based on this understanding, the technical solutions of the present disclosure essentially or the parts that contribute to the related art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the various embodiments of the present disclosure. The foregoing storage medium includes a USB flash disk, a mobile hard disk drive, a Read-Only Memory (ROM), a Random Access Memory (RAM), and various media that can store program codes, such as a magnetic disk, or an optical disk.

Therefore, this embodiment further provides the electronic device and storage medium of the real-time high-resolution binocular camera distortion correction implementation method based on FPGA, including one or more memories and one or more processors. The memory is configured to store program codes, intermediate data generated during program running, storage of model output results, and storage of models and model parameters. The processor is configured to process processor resources occupied during code running, and a plurality of processor resources occupied during model training.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

The above embodiments are only preferred embodiments of the present disclosure and cannot be used to limit the scope of protection of the present disclosure. Any non-substantial changes and substitutions made by a person skilled in the art on the basis of the present disclosure fall within the scope of protection claimed by the present disclosure.

What is claimed is:

1. A real-time high-resolution binocular camera distortion correction implementation method based on FPGA, comprising the following steps:

acquiring input video information in a YUV format, and performing YUV channel separation on the input video information to respectively obtain Y, U, and V video signals;

compressing the U and V video signals inputted, and not compressing the Y video signal inputted;

performing distortion correction on the Y video signal, and performing distortion correction on the compressed U and V video signals, comprising calculating binocular camera distortion parameters, calculating a coordinate mapping relationship of Y, U, and V channels, and calculating and generating target image data by using an interpolation algorithm;

amplifying U and V target image data that has been subjected to distortion correction to fit an input image; and outputting separated Y, U, and V channel target image data according to a raw image format.

2. The method as claimed in claim 1, wherein an FPGA end is used to perform distortion correction; the FPGA end is a xilinx ultrascale FPGA chip; and the chip is provided with ultra_ram to replace BRAM for data caching.

3. The method as claimed in claim 1, wherein when the input video information in the YUV format is acquired, the input video information in RGB or other formats is converted into the YUV format for display.

4. The method as claimed in claim 1, wherein when the coordinate mapping relationship of the Y, U, and V channels is calculated, pixel points on an image plane are re-arranged according to a distortion model; and gray values of the pixel points after spatial transformation are re-assigned.

5. The method as claimed in claim 4, wherein mapping coordinates are calculated by using an internal parameter matrix H of a camera, and distortion coefficients $k_i (i=1, 2, 3)$ and $p_i (i=1, 2)$; and assuming that $(x_p, y_p)$ is a pixel point on a target image, and $(x_s, y_s)$ is a pixel mapping coordinate corresponding to the pixel point $(x_p, y_p)$, a calculation formula of the pixel mapping coordinate $(x_s, y_s)$ is expressed as (1) and (2):

$$\begin{bmatrix} x_d \\ y_d \\ 1 \end{bmatrix} = H^{-1} \times \begin{bmatrix} x_p \\ y_d \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \times \begin{bmatrix} x_p \\ y_p \\ 1 \end{bmatrix} \tag{1}$$

-continued $$\begin{bmatrix} x_s \\ y_s \end{bmatrix} = \begin{bmatrix} \frac{1}{dx} & 0 \\ 0 & \frac{1}{dx} \end{bmatrix} \times$$

$$\begin{bmatrix} x_d \times (1 + k_1 r^2 + k_2 r^4 + k_3 r^6) + [2 \times p_1 \times y_d + p_2 \times (r^2 + 2x_d^2)] \\ y_d \times (1 + k_1 r^2 + k_2 r^4 + k_3 r^6) + [2 \times p_2 \times x_d + p_1 \times (r^2 + 2y_d^2)] \end{bmatrix} + \begin{bmatrix} u_0 \\ v_0 \end{bmatrix}. \tag{2}$$

6. The method as claimed in claim 1, wherein when the target image data is calculated and generated by using the interpolation algorithm, gray values of pixel points after spatial transformation are re-assigned by using bilinear interpolation, and after linear interpolation is performed once respectively in x and y directions, a gray value of a target pixel is obtained.

7. The method as claimed in claim 6, wherein assuming that the value of a function f at a point P=(x, y) is unknown, and assuming that the values of the function f at four points of Q11=(x1, y1), Q12=(x1, y2), Q21=(x2, y1), and Q22=(x2, y2) are known, linear interpolation is performed in the x direction to obtain formulas (3) and (4):

$$f(R_1) \approx \frac{x_2 - x}{x_2 - x_1} f(Q_{11}) + \frac{x - x_1}{x_2 - x_1} f(Q_{21}), R_1 = (x, y_1) \tag{3}$$

$$f(R_2) \approx \frac{x_2 - x}{x_2 - x_1} f(Q_{12}) + \frac{x - x_1}{x_2 - x_1} f(Q_{22}), R_2 = (x, y_2) \tag{4}$$

then linear interpolation is performed in the y direction to obtain a formula (5):

$$f(P) \approx \frac{y_2 - y}{y_2 - y_1} f(R_1) + \frac{y - y_1}{y_2 - y_1} f(R_2) \tag{5}$$

therefore, a final result of bilinear interpolation is expressed as a formula (6):

$$f(P) \approx \frac{(x_2 - x) \times (y_2 - y)}{(x_2 - x_1) \times (y_2 - y_1)} f(Q_{11}) + \frac{(x - x_1) \times (y_2 - y)}{(x_2 - x_1) \times (y_2 - y_1)} f(Q_{21}) + \tag{6}$$

$$\frac{(x_2 - x) \times (y - y_1)}{(x_2 - x_1) \times (y_2 - y_1)} f(Q_{12}) + \frac{(x - x_1) \times (y - y_1)}{(x_2 - x_1) \times (y_2 - y_1)} f(Q_{22}).$$

8. The method as claimed in claim 1, wherein when distortion correction is performed on the video signals of the Y, U, and V channels, respectively, the video signals are transmitted to an FPGA end according to the format of a pixel flow, received video data is cached into ULTRA_RAM, and since the ULTRA_RAM of a selected signal is 72 bits, 8-bit YUV422 data is first subjected to data extension and aligned to 72 bits, and then pixel data is stored into the ULTRA_RAM; and according to the binocular camera distortion parameters provided by a host computer, by means of assembly line arrangement, a pixel mapping coordinate in a raw image corresponding to one pixel is guaranteed to be calculated within each clock cycle, and the pixel mapping coordinate is stored according to the format of Q12.20.

9. The method as claimed in claim 1, wherein according to a correspondence relationship between integer parts of the pixel mapping coordinate, pixel data of four adjacent pixels are read from ULTRA_RAM for row caching, and when a coordinate after a mapping coordinate is calculated as (m, n), pixel values of four points of (m, n), (m+1, n), (m, n+1), and (m+1, n+1) are read;

a final pixel value is calculated according to a bilinear interpolation calculation formula and a coordinate mapping fractional part; and video streaming data of a single channel that has been subjected to distortion correction is outputted.

10. The method as claimed in claim 1, wherein the Y target image data that has been subjected to distortion correction is sent to data reorganization FIFO;

the U target image data that has been subjected to distortion correction is amplified, and then sent to the data reorganization FIFO; and the V target image data that has been subjected to distortion correction is amplified, further compressed, and then sent to the data reorganization FIFO.

\* \* \* \* \*